United States Patent Office 3,212,097
Patented Oct. 12, 1965

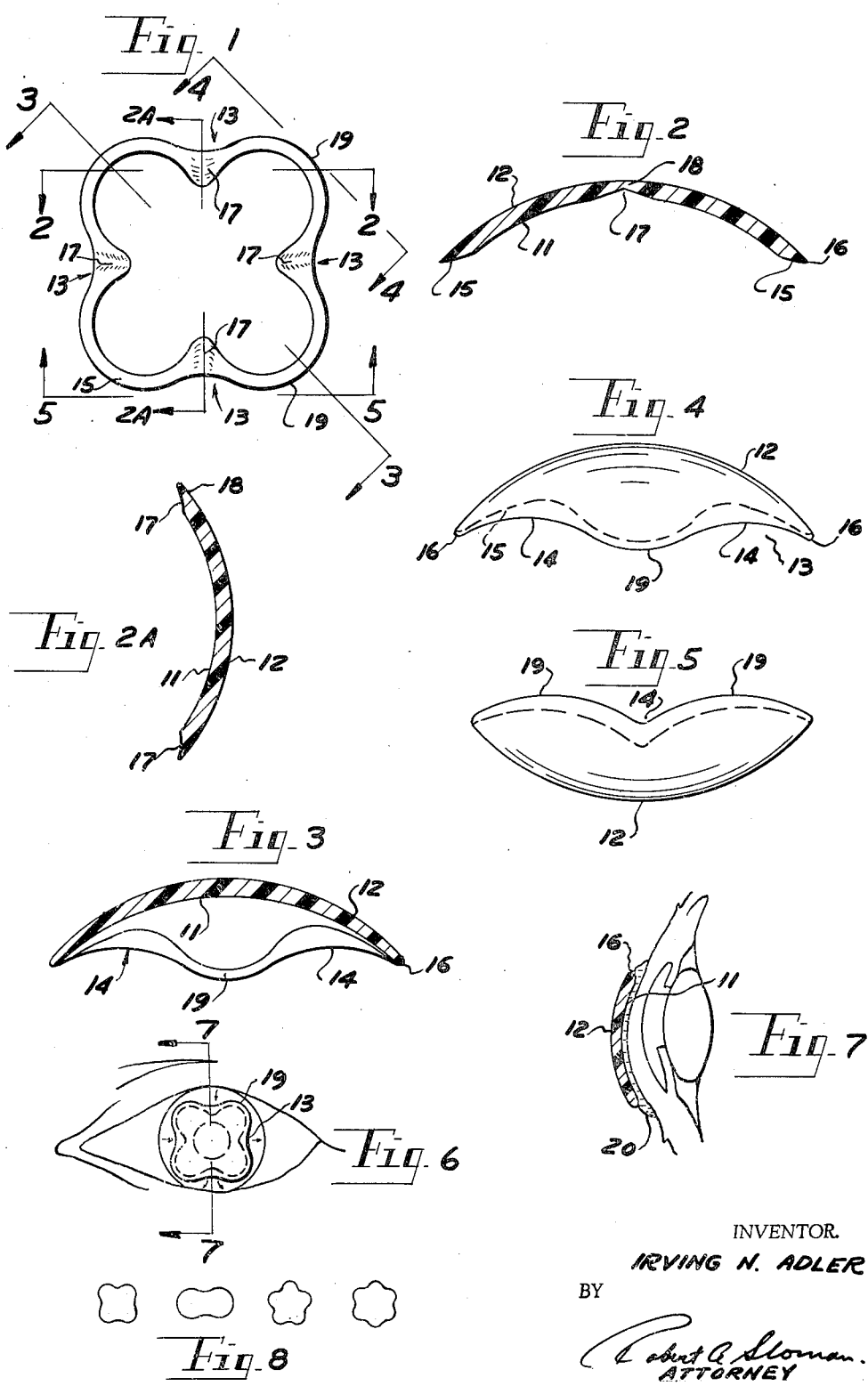

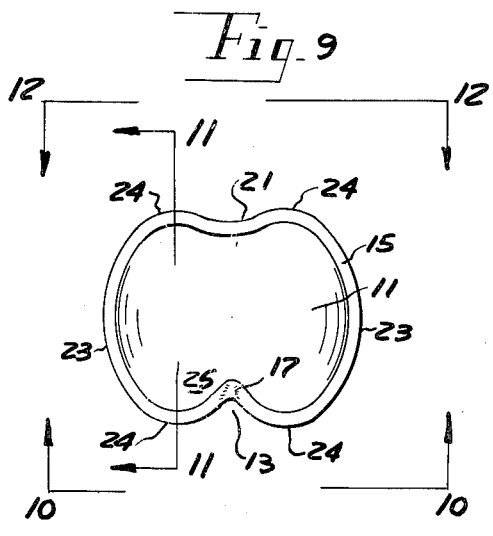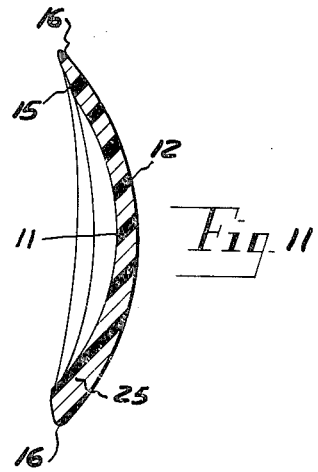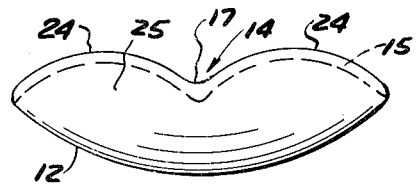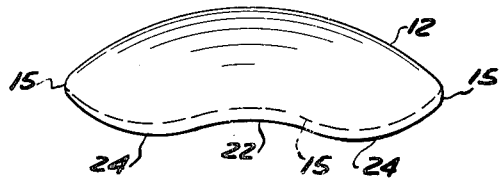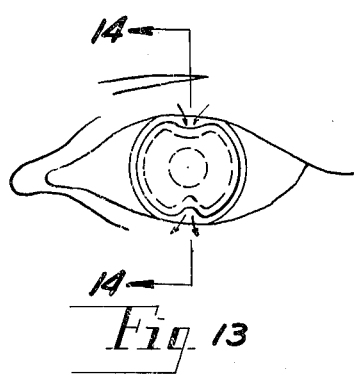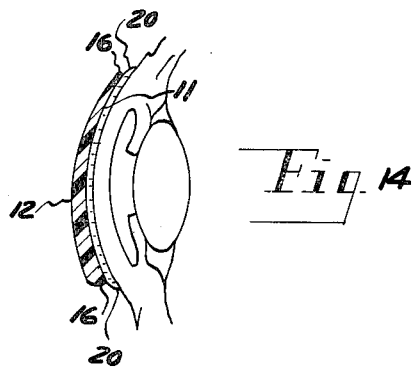
INVENTOR.
IRVING N. ADLER Oct. 12, 1965     I. N. ADLER     3,212,097
TRUNCATED PRISM BALLAST CONTACT LENS WITH INDENTATION
AND FLUID DRAINAGE CHANNEL AT BOTTOM EDGE
Filed April 12, 1962     3 Sheets-Sheet 3
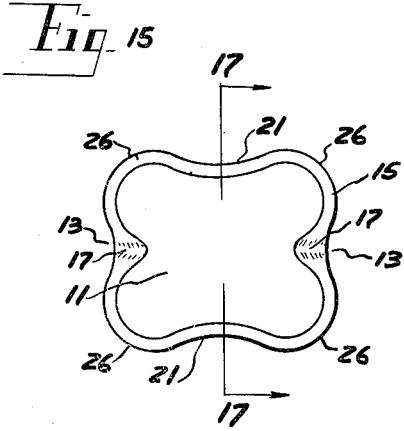
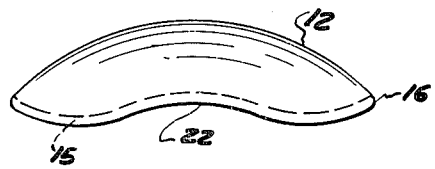
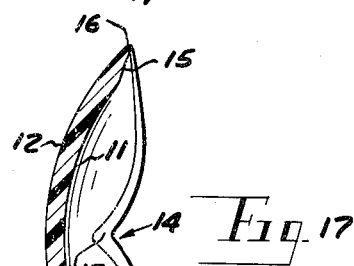
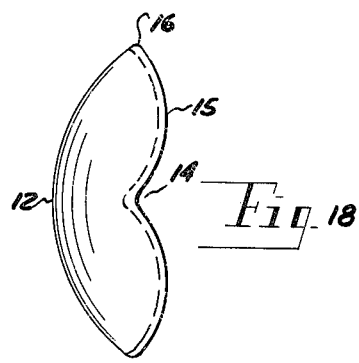
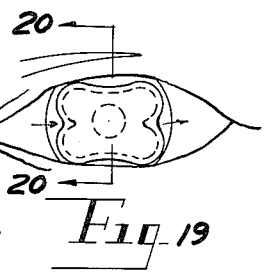
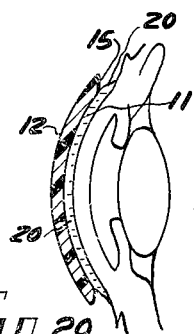
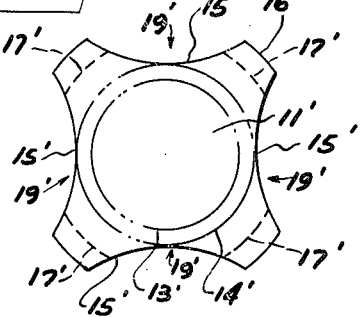
INVENTOR.
IRVING N. ADLER.
BY
Robert A. Sloman
ATTORNEY

3,212,097
TRUNCATED PRISM BALLAST CONTACT LENS WITH INDENTATION AND FLUID DRAINAGE CHANNEL AT BOTTOM EDGE
Irving N. Adler, Detroit 3, Mich., assignor of one-half to Richard Wlodyga, Warren, Mich.
Filed Apr. 12, 1962, Ser. No. 187,004
1 Claim. (Cl. 351—160)

This application is a continuation-in-part of my co-pending patent application, Serial No. 2,153, filed January 13, 1960 relating to an optical contact lens, now abandoned.

The invention relates to a new design of scleral and corneal contact lenses made of acrylic plastic or other suitable material.

The object of the present invention is to provide an improved contact lens with less corneal insult, less corneal coverage, and a freer inherent tearflow. This fact becomes evident when we consider the basic fact that tears are fluid and fluid will always follow the line of least resistance. When contact lenses are designed with this thought in mind, they must necessarily be of an aspherical nature.

Heretofore many difficulties have been encountered in the use of contact lenses, including severe lid pressure and discomfort primarily due to lack of fluid lubrication or normal flow of precorneal fluid between the eye surface and the undersurface of the contact lens applied thereto.

It is another object of the present invention to provide concave-convex type of optical contact lens having formed in the outer peripheral portion thereof a plurality of radially and axially extending indentations to thus provide improved passageways for the flow of fluids.

It is another object of the present invention to form in the bevel portion of the lens body adjacent the concave surface thereof, and with respect to some or all of said indentations, a series of radially extending channels which are formed into the said bevel portion of the lens body to form portions of reduced thickness therein and to facilitate the flow of precorneal fluid beneath the contact lens.

It is another object of the present invention to provide a novel form of scleral or corneal contact lens which is so constructed as to provide for increased lubrication for the flow of tears and corresponding improved comfort in the use thereof. This provision for the flow of fluid has a tendency of equalizing osmotic pressure with respect to portions of the cornea upon the interior and the exterior of the said lens, and to provide for improved circulation of said fluids with accompanying lubrication and improved comfort to the user, and whereby the new lens may be tolerated sooner by the new user and for longer periods and with increased comfort.

These and other objects will be seen from the following specification and claim in conjunction with the appended drawings in which:

FIG. 1 is a bottom plan view of the present optical contact lens with its interior concave surface up and being of increased scale.

FIG. 2 is a plan section taken on line 2—2 of FIG. 1, and on an increased scale.

FIG. 2a is a section taken on line 2a—2a of FIG. 1, on a slightly increased scale.

FIG. 3 is an angular section taken on line 3—3 of FIG. 1, on an increased scale.

FIG. 4 is an angular view taken on line 4—4 of FIG. 1, on an increased scale.

FIG. 5 is a bottom edge view taken on line 5—5 of FIG. 1 on an increased scale.

FIG. 6 is a front elevational view of the present optical contact lens as positioned over the human eye.

FIG. 7 is a fragmentary cross sectional view taken on line 7—7 of FIG. 6, and on an increased scale, being taken through the midsagital portion of the eye showing the lens as floating upon the precorneal fluid layer thereof.

FIG. 8 is a full scale plan view of modified forms of the present optical contact lens corresponding to FIG. 1.

FIG. 9 is a plan view of a right prism ballast optical contact lens with the concave interior surface thereof facing upwardly.

FIG. 10 is a bottom view taken on line 10—10 of FIG. 9, on an increased scale.

FIG. 11 is a vertical section taken on line 11—11 of FIG. 9, on an increased scale.

FIG. 12 is a top view taken on line 12—12 of FIG. 9, on an increased scale.

FIG. 13 is a fragmentary front elevational view showing the positioning of a left contact lens corresponding to FIG. 9 when applied to the left human eye.

FIG. 14 is a vertical section on an enlarged scale taken on line 14—14 of FIG. 13.

FIG. 15 is a plan view of a slightly different form of optical contact lens viewed from the concave undersurface thereof.

FIG. 16 is a plan view thereof on an increased scale.

FIG. 17 is a vertical section on an enlarged scale, taken on line 17—17 of FIG. 15.

FIG. 18 is a left end view of the lens shown in FIG. 15, on an increased scale.

FIG. 19 is a fragmentary front elevational view showing the application of the lens shown in FIG. 15 to the human eye.

FIG. 20 is a vertical section on an increased scale taken on line 20—20 of FIG. 19.

FIG. 21 is a plan view of another form of optical contact lens shown at approximately 10-times its natural size.

It will be understood that the above drawings illustrate merely preferred embodiments of the invention, and that other embodiments are contemplated within the scope of the claim hereinafter set forth.

Referring to the drawing, the present optical contact lens shown in FIG. 21 forms a part of the disclosure of my earlier filed copending patent application, Serial No. 2,153, filed January 13, 1960, relating to an optical contact lens. Said lens includes the exterior convex surface 11' and the interior concave surface corresponding to the surface 11 of the lens body shown in FIG. 20, there being indicated in dotted lines, FIG. 21, the optical area 13', which for illustration, has a diameter of 6 mm.

Another ring is indicated at 14' in dotted lines, FIG. 21 indicating the depth of diameter for the series of notches or arcuate grooves 15' formed in the peripheral edge of the lens. For illustration the diameter of this circle 14' is 7 mm.

The above described series of arcuate notches formed in the periphery of the lens thus define a plurality of coplaner contact surfaces 17' which are of arcuate form in plan, but upon their bottom contact surfaces are coplanar, thus providing limited points of contact between the lens and the eye.

It is contemplated as a part of the present invention that the notches 15', equally spaced around the periphery of the contact portion of the present lens, do thus provide in the contact elements 17' a series of contacting surfaces of equal extent. In operation with the lens applied to the eye, there are provided by the said notches 15' in the concave-convex surface of the lens, a series of transverse passages 19', which establish cmmunication between portions of the eye surface under the lens and on the exterior thereof, to thereby provide equalized hydrostatic fluid pressure or osmotic pressure for increased comfort in use of the present lens.

By this construction, it is apparent that there will be an improved circulation of fluids of the eye over the eye surface and into and under the contact lens with accompanying increased lubrication and improved comfort to the user.

This increased flow of fluid, namely the human tear, thus provides a very thin support medium between the eye surface and the surface of the plurality of contacting portions of the lens.

The end result of the present improved construction is that lid pressure is reduced inasmuch as the lid no longer contacts the lens throughout its periphery in view of the notches provided therearound.

The present construction thus provides for the use of a slightly larger lens to achieve better centering of the contact lens with respect to the pupil of the eye.

The flow of the tear fluids over the eye surface and through the passages 19' under the lens thus provide an improved washing action in contrast with the older type of peripheral contact where fluid actually was trapped within the lens and accordingly an improved circulation is achieved.

This has the additional advantage in that the metabolism is improved by equalizing the nourishment going to the cornea of the eye.

The present construction may be tolerated more quickly by the new user of contact lenses, and at the same time may be worn for longer periods without discomfort.

The present preferred embodiment of the invention shown in FIG. 21 contemplates the use of four equally spaced notches formed around the periphery of the lens to thus provide the limited arcuate contacts 17. It is contemplated that three such notches may be employed for this purpose.

As viewed in FIG. 21, the arcuate length of the contact points 17' may vary slightly depending upon the initial diameter of the contact lens. For example, the distance on the exterior of the lens of the surface of contact or line of contact is .7 mm., for example when a 10.5 mm., diameter lens is used; however, this arcuate length may be .8 mm., when using a 9.5 mm., diameter lens as is seen in FIG. 21; the inner line of contact shown in dotted lines is actually longer than the outer line of contact.

In any event, the total areas of contact of the respective contact surfaces 17' is substantially less than one-half the circumference of the periphery of the contact lens.

The present contact lens may be made of any suitable transparent material, such as acrylic or other plastic or equivalent, or may be made of glass.

Referring to FIGS. 1 through 8, there are three basic types of contact lenses hereunder described, such as shown in FIGS. 1, 9 and 15. Modifications or variations thereof will thus result in multiple designs. Each of these could be made either scleral (12–14 mm.) or corneal (8–11 mm.) types. One basic design described hereunder in connection with FIGS. 1 through 8 provides an optical contact lens having a transparent body which includes the inner concave optical surface 11 and the outer convex optical surface 12.

The peripheral edge of the body of the lens has formed therein a plurality of spaced radial inwardly curved identations 13' which extend normal to the lens axis. Said identations also extend axially of the lens body, as indicated at 14 in FIG. 4.

An interior peripheral tapered and continuous bevel 15 is formed in the concave surface 11 of the lens body, being of decreasing thickness towards its outer edge, as shown in FIG. 2, and transversely rounded at 16 to smoothly merge with the outer convex surface 12.

For illustration, the bevel 15 on the concave surface 11 is approximately .8 to 1.5 mm., and is ground with a tool which is 1 mm. flatter than the flattest optic curvature as at 11, FIG. 2. The spaced radially extending channels 17 are formed in the bevel surface 15 at some or all of the said indentations 13–14, and are tapered axially inward of the lens body, as in FIG. 2, defining portions 18 of reduced thickness in the concave surface 11. The said channels are furthermore defined by converging planes which are obtusely angularly related as best shown in FIG. 2.

The said bevel 15 adjacent the said channels 17 is of increased thickness and extends radially inward, as shown in FIG. 1 to define the radial length of the corresponding channels 17 of which in the preferred embodiment, shown in FIG. 1, there may be two or four in diametrically opposed relation. For if only two of such channels are employed these could be either the top and bottom channels 17, or the opposed side channels as at 17, FIG. 1. It is contemplated, however, that the said channel 17 may be arranged radially with respect to each of the above defined troughs 13–14 to provide a plurality of fluid passages for establishing communication between portions of the eye or sclera, shown in FIG. 6, with portions of the eye over which the lens is positioned, as for example the cornea shown in FIG. 6. Troughs 13–14 provide for greater corneal exposure. It is contemplated that a plurality of such notches may be employed depending upon the type of cornea encountered.

Accordingly, the said channel 17 in cooperation with the trough 13–14 provides a means of facilitating fluid transmission through and under the lens and with respect to the precorneal fluid layer 20, such as shown in FIG. 7, for the purpose of establishing or equalizing osmotic pressure, improving circulation of the precorneal fluid with accompanying lubrication and improved comfort to the user.

The peripheral portions of the lens as shown in FIG. 1 between the respective troughs and indentations 13–14 are curved or rounded as indicated at 19, FIGS. 1, 4 and 5, to thus provide equally spaced crests 19 which help to center the lense over the cornea.

The above described outer portion of the bevel 15 and rounded portion 16 is suitably beveled and polished to provide a smooth continuous surface between the inner and outer concave and convex surfaces of the lens body. This bevel 15 follows the entire outline of the body, including the cut of the trough or indentation 13–14 in both the concave and convex surfaces 11–12 respectively. These curved portions 19 smoothly merge with the corresponding inwardly curved indentations 13, shown in FIG. 1 and approximate a "S" curve.

FIG. 6 illustrates the positioning of the present optical contact lens in FIG. 1 upon the human eye and with respect to the cornea thereof, whereas FIG. 7 has a vertical section through the midsagital portion of the eye indicating the relative positioning of the lens and its spacing from the eye surface due to the inter-position of the precorneal fluid layer 20 therebetween, upon which the contact lens actually floats.

The base curve 11 of the lens shown in FIGS. 1 and 2 for example approximates the flattest meridian of the cornea, except in cases of astigmatic corneas of two diopters and greater. These astigmatic corneas are fitted .50 diopter, steeper plus .25 diopter, steeper for each additional diopter of corneal astigmatism up to and approaching conical corneas.

The conical corneas are best fitted with a base curve 1 to 2 diopters flatter than the flattest meridian of the cornea. A two or four-trough lens, the troughs being indicated at 13–14, is applied to corneas of greater astigmatism than 1.5 diopters. A 3, 5 and 6 trough type of lens, such as shown in FIG. 8 would be applied to corneas of less than 1.5 diopters of astigmatism.

With the proper application of the present lens, it has been found clinically that the cornea maintains a more normal tearflow, and thereby maintains a more normal metabolism. The present lens is designed for alleviating symptoms of heat, fogging, and excessive tearing, which are the chief complaints of contact lens wearers today. Objectively, it has been shown that upon removal of the present contact lens, after a wearing time of 10 to 12 hours, the corneal changes are minimized.

One of the primary purposes in the formation of the indentations or troughs 13–14, shown in FIGS. 1 and 4, and the associated channels 17, is the provision of means for facilitating the fluid flow or transmission of fluid throughout that portion of the eye normally covered by the contact lens for the purpose of lubrication and for equalizing osmotic pressure, and at the same time improved comfort to the user and minimizing or eliminating fatigue in the use of the contact lens.

A slight variation of the present invention is shown in FIGS. 9 through 14, wherein it is seen, as particularly viewed in FIG. 9, that the optical contact lens herein is distinguishable from the lens shown in FIG. 1 in the sense that the lens is provided with a ballast or weighted portion in the inferior nasal quadrant, as indicated at 25, FIGS. 9 and 11, by which the lens is non-rotatable when once applied to the corneal surface of the eye, or scleral portions thereof.

In some cases of residual astigmatism, it is undesirable that the lens have a normal rotation characteristic. For this purpose a prism ballast is used as at 25, and which is normally located 10 degrees base down and nasal. Not only does this prevent rotation of the lens, but it allows the fitter to grind into the front surface of the lens, namely the convex optical portion thereof, the additional correction for the residual astigmatism, thus resulting in fully corrective acuity, which would not be possible with a rotating lens.

As shown in FIGS. 9 through 14, there is employed the same general type of transparent body which includes the inner concave surface 11, the outer convex optical surface 12. There is also provided around the periphery of the lens body an interior peripheral reverse undercut and tapered bevel 15, similar to the bevel shown in FIG. 2, as an extension of the interior concave surface 11, and being of decreasing thickness towards its outer edge, FIG. 11, and also being transversely rounded at 16 and smoothly polished so as to merge with the curvature of the outer convex surface 12.

The off-center ballast 25 is provided by an increased thickness in the inferior nasal quadrant of the lens body, FIGS. 9 and 11, to establish the non-rotation characteristic above referred to.

The peripheral edge of the lens body at the top thereof has formed therein as at 21 a radially extending inverted truncation which is substantially normal to the lens axis, and which truncation as shown at 22, FIG. 12, also extends axially of the lens body and thus defines in the said lens a passageway for gathering tearflow of the precorneal fluid layer 20, or relative thereto, directing the same toward the center of the eye over which the optical contact lens is applied, as best shown in FIGS. 13 and 14.

There is also formed upon the opposite or bottom edge of the lens body, as shown in FIG. 9, the oppositely arranged substantially V-shaped or U-shaped radially extending fluid drainage channel 13, which channel also extends axially of the lens body as designated at 14, FIG. 10.

The peripheral arcuate contact surface elements 23, FIG. 9, provide the support means for the contact lens upon the cornea, but with the pre-corneal fluid interposed.

In the illustrative embodiment of the invention, the V-shaped radially and axially extending channel 13–14 shown in FIG. 9 and FIG. 10, provides a means of fluid drainage and for the circulation of tears through and under the contact lens and with respect to the precorneal fluid layer 20, shown in FIG. 14.

It is contemplated also as a part of the present invention that a radially extending channel 17 be formed in the bevel 15, centrally of and adjacent the said V-shaped channel 13–14 to further facilitate the flow of tears and the drainage of fluid under the contact lens.

The inverted truncation, 21, FIG. 9, including the structure shown at 22, FIG. 12 at the superior or top portion of the lens helps to gather the normal tearflow and directs the same towards the center of the eye. The V-shaped channel 13–14, and the associated channel groove 17 acts as a draining channel for fluid from under the said contact lens, such as indicated by the arrows in FIG. 13, and shown in mounted relationship with FIG. 14 and wherein it is noted the interior concave surface 11 of the lens, is spaced from the cornea or scleral portion of the eye by the precorneal fluid layer 20, FIGS. 13–14, being schematic diagrams for the purpose of illustrating the position of use of the present optical contact lens.

Another variation of the present invention is shown in FIGS. 15 through 20 and with particular reference to FIG. 15, wherein it is noted that the lens body is horizontally elongated in order to accommodate the narrow palpebral fissures with tight lids which are often encountered in the fitting of contact lenses. The vertical measurement of the palpebral opening being less than 7 mm., in the present form in FIG. 15 allows the lens to be free of the lid pressures, which are so often detrimental to the successful wearing of contact lenses.

The present lens, however, includes a transparent lens body, preferably of a suitable plastic material which includes the interior concave optical surface 11 and the above described exterior convex optical surface 12. The peripheral edge of the lens body also has formed therein the tapered bevel 15, the same as above described, which is flatter than the flatest curvature 11 of the concave surface, decreases towards its outer edge, being transversely rounded to smoothly merge as at 16 with the outer convex surface 12.

The peripheral edge of the body of said lens has formed at its opposite ends and centrally thereof, a pair of opposed radial troughs 13, which troughs extend axially as shown at 14 in FIG. 18, and which are provided for the primary purpose of orienting the lens to the use position shown in FIG. 19, and for maintaining such position.

There are also formed at the top and bottom of the lens body centrally thereof a pair of opposed radially extending truncations 21 which extend normally of the lens axis and which are provided for the primary purpose of establishing the passageway for fluids between the lens body and the cornea or scleral portions of the eye, as shown in FIGS. 19 and 20. The said bevel 15 at the said end troughs 13–14 has formed therein the radially extending tapered channels 17, which extend axially inward of the lens body for the purpose of facilitating the tearflow in respect to the troughs 13–14 and provide the means for exhaust and fluid drainage with respect to the contact lens.

The peripheral edge of the lens body also has formed at its upper and lower ends centrally thereof a pair of opposed radially extending truncations which extend normally of the lens axis as shown at 21, FIG. 15. These truncations also extend axially of the lens body, as shown at 22 and are provided for the purpose of orienting the lens body with respect to the cornea or scleral portions of the eye, as shown in FIG. 19. Thus with the modification of the lens as shown in FIG. 15 and as applied to the eye in FIGS. 19 and 20, provision is made for the continued tearflow of fluids relative to the precorneal fluid layer 20, FIG. 20, as a means for equalizing osmotic pressure upon the inside and exterior portions with respect to the contact lens to thus improve circulation of the precorneal fluid and the tearflow, with accompanying lubrication and comfort to the user.

With respect to the bevel portion of the lens, shown in FIGS. 9 and 11, as at 15, this is in the nature of a reverse bevel and is put into the concave surface with a small tool at an angle of approximately 20 degrees with the base curve of the lens.

Having described my invention, reference should now be had to the following claim.

I claim:

In an optical contact lens having a transparent lens body including inner concave and outer convex optical surfaces; there being an interior peripheral reverse undercut tapered continuous bevel formed in said concave surface of decreasing thickness towards its outer edge and transversely rounded to smoothly merge with said outer surface; said body including an off-centered prism ballast of increased thickness in its inferior nasal quadrant adjacent the bottom of the body rendering the lens non-rotatable when applied to the corneal surface of the eye; the improvement comprising:

the peripheral edge of said body at the top thereof having formed therein a radially extending inverted truncation substantially normal to the lens axis, said truncation also extending axially of the lens body for the purpose of gathering tear flow and directing the same toward the center of the eye over which the lens is applied;

there being an oppositely disposed radial indentation in the peripheral edge of the body extending into said prism ballast at its bottom defining a trough formed at an angle of approximately 90 degrees to the lens axis, said indentation also extending axially of the lens body;

there being a substantially V-shaped radially extending fluid drainage channel formed in the bevel in the bottom edge of the body at said indentation, said channel extending into the concave surface radially inward of said bevel, said channel being defined by converging surfaces in angularly related planes extending radially inward of said body;

said truncation, said indentation and said fluid drainage channel facilitating the flow of precorneal fluid between the lens body and the eye for the purpose of equalizing osmotic pressure and improving in flow and out flow circulation of fluids with accompanying lubrication and improved comfort.

References Cited by the Examiner

UNITED STATES PATENTS

| 2,247,628 | 7/41 | Beitel | 88—54.5 |
| 2,393,266 | 1/46 | Riddell | 88—54.5 |
| 2,510,438 | 6/50 | Tuohy | 88—54.5 |
| 2,653,515 | 9/53 | Stimson | 88—54.5 |
| 2,989,894 | 6/61 | Gordon | 88—54.5 |

FOREIGN PATENTS

| 496,583 | 10/53 | Canada. |
| 908,135 | 8/45 | France. |
| 802,486 | 10/58 | Great Britain. |
| 809,894 | 3/59 | Great Britain. |
| 852,836 | 11/60 | Great Britain. |

OTHER REFERENCES

Lester: "Residual Astigmatism," Article in "C.L.A.O. Papers," vol. 1, No. 6, October 1959, pp. 15–18 cited.

DAVID H. RUBIN, *Primary Examiner.*